United States Patent
Eilers et al.

(10) Patent No.: US 8,943,398 B2
(45) Date of Patent: Jan. 27, 2015

(54) SYSTEM AND METHOD FOR GENERATING COLORED TABLE FROM VARIABLE HEIGHT BACKGROUND CONTENT IMAGERY TO SUPPORT RICH CONTENT IN MULTIPLE EMAIL READERS

(75) Inventors: Laban D. Eilers, Cambridge, MA (US); Jeff L. Kwan, Lexington, MA (US); Andrei Dinin, Arlington, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 546 days.

(21) Appl. No.: 12/417,544

(22) Filed: Apr. 2, 2009

(65) Prior Publication Data

US 2010/0257243 A1 Oct. 7, 2010

(51) Int. Cl.
| | |
|---|---|
| G06F 17/00 | (2006.01) |
| G06K 9/36 | (2006.01) |
| H04N 19/176 | (2014.01) |
| G06F 17/22 | (2006.01) |
| G06F 17/24 | (2006.01) |
| H04N 19/186 | (2014.01) |
| H04N 19/124 | (2014.01) |
| H04N 19/90 | (2014.01) |

(52) U.S. Cl.
CPC ...... *H04N 19/00278* (2013.01); *G06F 17/2247* (2013.01); *G06F 17/245* (2013.01); *G06F 17/248* (2013.01); *H04N 19/00315* (2013.01); *H04N 19/0009* (2013.01); *H04N 19/00945* (2013.01)
USPC ........... 715/227; 715/234; 715/239; 382/166; 382/251

(58) Field of Classification Search
CPC .. G06F 17/2247; G06F 17/245; G06F 17/248
USPC ........... 715/227, 228, 234, 239; 382/166, 251
See application file for complete search history.

(56) References Cited

U.S. PATENT DOCUMENTS

| | | | | |
|---|---|---|---|---|
| 6,026,180 | A * | 2/2000 | Wittenstein et al. | 382/166 |
| 6,674,907 | B1 * | 1/2004 | Shum et al. | 382/166 |
| 6,750,992 | B1 * | 6/2004 | Holub | 358/504 |
| 7,792,887 | B1 * | 9/2010 | Amirghodsi | 382/165 |
| 2001/0049699 | A1 * | 12/2001 | Pratley et al. | 707/503 |
| 2005/0071755 | A1 * | 3/2005 | Harrington et al. | 715/511 |
| 2006/0092329 | A1 * | 5/2006 | Noji | 345/690 |
| 2007/0009028 | A1 * | 1/2007 | Lee et al. | 382/190 |
| 2008/0178073 | A1 * | 7/2008 | Gao et al. | 715/243 |

FOREIGN PATENT DOCUMENTS

| | | | | |
|---|---|---|---|---|
| WO | WO2008/089473 | A1 | 7/2008 | |
| WO | WO 2010114574 | A1 * | 10/2010 | H04N 7/26 |

OTHER PUBLICATIONS

Ferrar and Brownfield; Image2HTML Conversion of GIF and JPEG files to HTML tables; Jun. 1, 2007; pp. 1-23. Entire website retrieved: http://web.archive.org/web/20070531153929/http://www.flowerfire.com/image2html/ and faq.html, download.html, online.html, and source/Image2HTML.tar.gz files.*

(Continued)

*Primary Examiner* — Chau Nguyen
(74) *Attorney, Agent, or Firm* — Jessica Costa

(57) ABSTRACT

Systems and methods for generating presentationally-rich email messages having imagery and variable height content entry areas that are compatible across multiple email readers.

19 Claims, 6 Drawing Sheets

(56) References Cited

OTHER PUBLICATIONS

No Author; Expanding Table; Feb. 23, 2008; StealthDesign.com; pp. 1-3. Originally available at http://www.stealthdesignz.com/index2.php?page=photoshop/expandingtable and retreived from http://web.archive.org/web/20080223062101/http://www.stealthdesignz.com/index2.php?page=photoshop/expandingtable.*
No Author; Microsoft Outlook 2002; 2001; Microsoft Corporation; 2002 version (unpatched); pp. 1-2.*
Lemay, Laura et al; Sams Teach Yourself Web Publishing with HTML 4 in 21 Days; 1999; Sams Publishing; Second Edition; pp. 327.*
Anthony Thyssen, "ImageMagick v6 Examples—Color Quantization and Dithering", created on Aug. 11, 2006, http://www.imagemagick.org/Usage/quantize/, pp. 49.*
"Stealth Designz.com//Superior Designz for Superior People—Expanding Table" Internet Citation, Nov. 2, 2005, XP002558953.
Gervautz M. et al: "A simple method for color quantization: Octree quantization" Jan. 1, 1990, XP002439082.

* cited by examiner

FIG. 2 *Prior Art*

SYSTEM AND METHOD FOR GENERATING COLORED TABLE FROM VARIABLE HEIGHT BACKGROUND CONTENT IMAGERY TO SUPPORT RICH CONTENT IN MULTIPLE EMAIL READERS

FIELD OF THE INVENTION

This invention relates to supporting email content compatibility with multiple email clients, and more particularly to systems and methods for generating colored table from variable height background content imagery to support rich content in multiple email readers.

BACKGROUND OF THE INVENTION

With the continuous advances in web page programming languages, such as HTML, XHTML, DHTML and other markup languages, and in particular in the more prevalent use of style sheet languages such as Cascading Style Sheets (CSS), which assist in the separation of presentation of web content from the actual content itself, web pages are becoming more and more sophisticated, both in content and presentation.

Ideally every email reader would display any given email in the same way. That is, the presentation of a given email would appear identical regardless of which email reader, for example Outlook, Gmail, Hotmail, Yahoo!, AOL, etc., displays it. However, while vendors of web browsers tend to make frequent and ongoing updates to the browsers to support and keep up with the latest changes to popular web page generation languages in order to be able to render web page content from documents of multiple types and written in different languages, vendors of email readers have not typically been so diligent in providing support of all features of accompanying style sheet languages.

For example, many features of the popular style sheet language CSS, including repeatable background images, are not supported by some email readers. The result is often that presentationally-rich web pages written using style sheet languages cannot be sent in email messages and expected to be rendered by the email reader as it would be displayed by a typical browser.

Accordingly, it would be desirable to provide techniques for rendering presentationally-rich content readable and presentable across typical email readers.

SUMMARY OF THE INVENTION

Embodiments of the invention are directed to flexible email message generating template building techniques and systems, and email generating templates having content-rich imagery and auto-expanding user-editable content areas that grow and shrink according to an amount of user content inserted therein.

In an embodiment, a pixelated image is translated into an email-readable table by quantizing each of the pixels in the image into a plurality of discrete colors; generating an email-readable table comprising a plurality of table cells, each table cell corresponding to a discrete group of pixels and each pixel in the quantized image belonging to only one discrete group of pixels, each discrete group of pixels comprising at least one pixel and corresponding to either a single pixel or to a plurality of adjacent pixels that have been quantized into a same discrete color and are arranged in the quantized image having a first number of pixels in a first dimension and a second number of pixels in a second dimension; and setting a background color of each of the respective table cells to the discrete color of the pixels belonging to the respective table cell's corresponding discrete group of pixels.

Other embodiments include email message template generating systems and techniques and email message generating systems and techniques.

BRIEF DESCRIPTION OF THE DRAWINGS

FIG. 2 illustrates an example implementation of the template illustrated in FIG. 1.

DETAILED DESCRIPTION

Embodiments of the invention implement flexible email message generating template building techniques and systems, and email generating templates having content-rich imagery and auto-expanding user-editable content areas that grow and shrink according to an amount of user content inserted therein, while being compatible for display by multiple different types of email readers.

Figure 1:
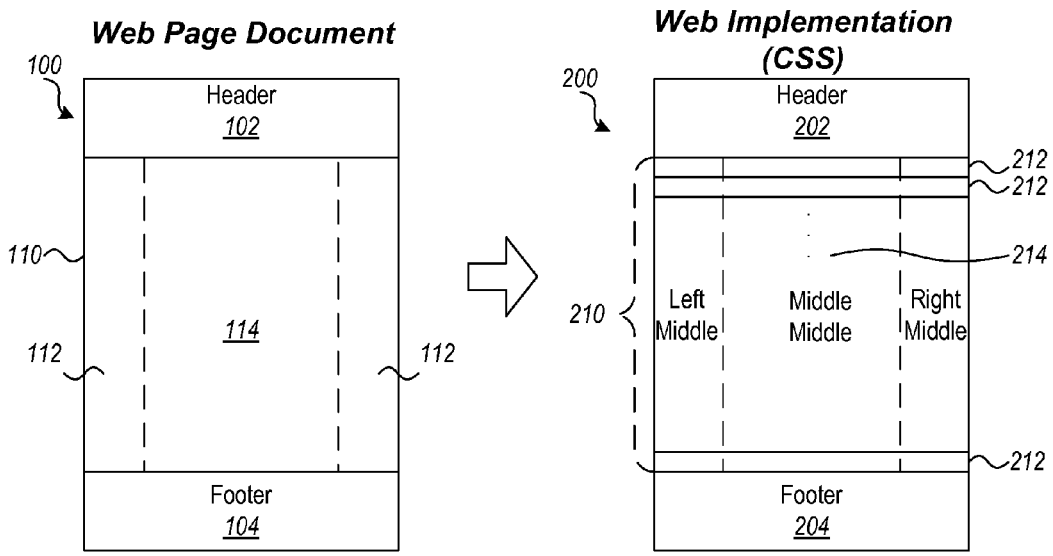
FIG. 1 illustrates an example of a presentationally-rich email message template.

Turning first to FIG. 1, there is shown therein an example of a presentationally-rich email message template 100 that includes a header 102, a footer 104, and a middle area 110. The header 102 and footer 104 may include content such as imagery and text that is inserted in the foreground and may or may not be editable by the user. In a template, the header 102 and footer 104 are preferably configured as non-editable by the end user of the template, but could be configured as editable as long as all content (both template designer-supplied and end user-supplied, is inserted into the foreground layer of the content area(s).

The middle area 110 includes a background image 112 and a foreground user-editable content container 114. The user-editable content area 114 may fill the entire middle area 110, or may be confined to a fixed area (as indicated by the dotted lines) of the middle area 110 of the template 100. In an email message template 100, ideally the end user can insert as much text or other content into the user-editable content area 114 as desired, and consequently it is desirable that the user-editable content area 114 automatically expands downward, pushing the footer area 104 downward on the display, as the user enters content and fills the user-editable content area 114. That is, the user-editable content area 114 should be auto-expanding and auto-contracting according to the amount of user-inserted content inserted therein.

The user-editable content area 114 could be implemented, for example, using an auto-expanding user-editable content container as described in detail in co-pending U.S. application Ser. No. 12/060,254, entitled "Flexible Web Page Template Building System And Method", filed Mar. 31, 2008, which is assigned to the same Assignee of interest herein and which is hereby incorporated by reference in its entirety. The document 100 itself could be implemented, for example, using the web page building and web page template building techniques described in U.S. application Ser. No. 12/060,254.

As described in U.S. application Ser. No. 12/060,254, one technique for implementing the auto-expanding user-editable content container and background image is to automatically repeat the background image as the content container 114 expands, and to remove instances of the background image as the content container 114 contracts. An example implementation of the template 100 is illustrated in FIG. 2 at 200, wherein the document 200 is implemented as having a header section 202, a footer section 204, and a repeatable middle section component 212 which is repeated between the header section 202 and footer section 204 as many times as needed to accommodate the size of the auto-expanding user-editable content container 214 positioned in the foreground in the middle section 210. Thus, the middle section 210 may include one or many instances of the repeatable middle section component 212 depending on the amount of user inserted content in the auto-expanding user-editable content container 214.

In a web browser or an email reader, which translates HTML and/or other markup languages into displayable content, one technique of implementing the middle section 210 is to separate the presentational attributes (e.g., text fonts, sizes and attributes, background colors and styles, element alignment, and other look and formatting attributes of the document) from the actual content of the document using a style sheet language such as CSS. The use of a style sheet to specify the presentation of the document significantly simplifies the clarity of the markup language document and is utilized by many web developers and supported by many browsers and, to some extent, email readers. However, because not all email readers support style sheet language code, and since many specifically do not support the background image feature of CSS (or sometimes even of HTML), in accordance with one aspect of the invention, once the background imagery of an email message template or other similar document is decided upon, and the area(s) over the background image of user-insertable content is defined, the background image(s) are converted to an HTML table, which is supported by all email readers comprising a plurality of colored cells which when rendered, display the background image.

Figure 3:
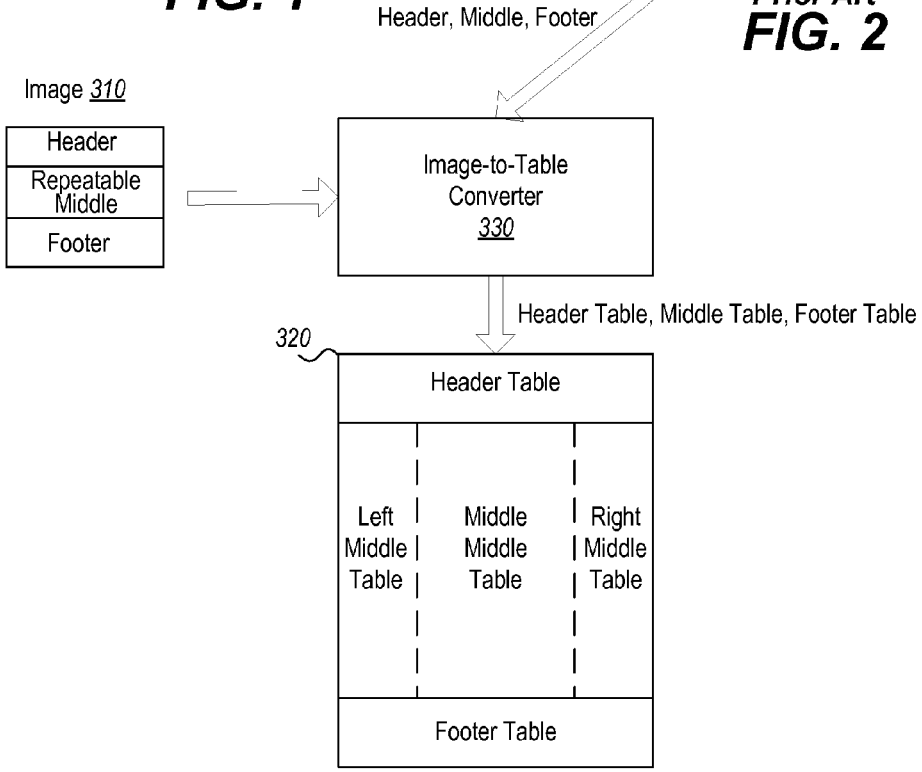
FIG. 3 diagrammatically illustrates the conversion of a background image document to a table by an image-to-table converter.

FIG. 3 illustrates the conversion of a background image document 310 to an email-readable table 320 (such as an HTML table) by an image-to-table converter 330.

Figure 4:
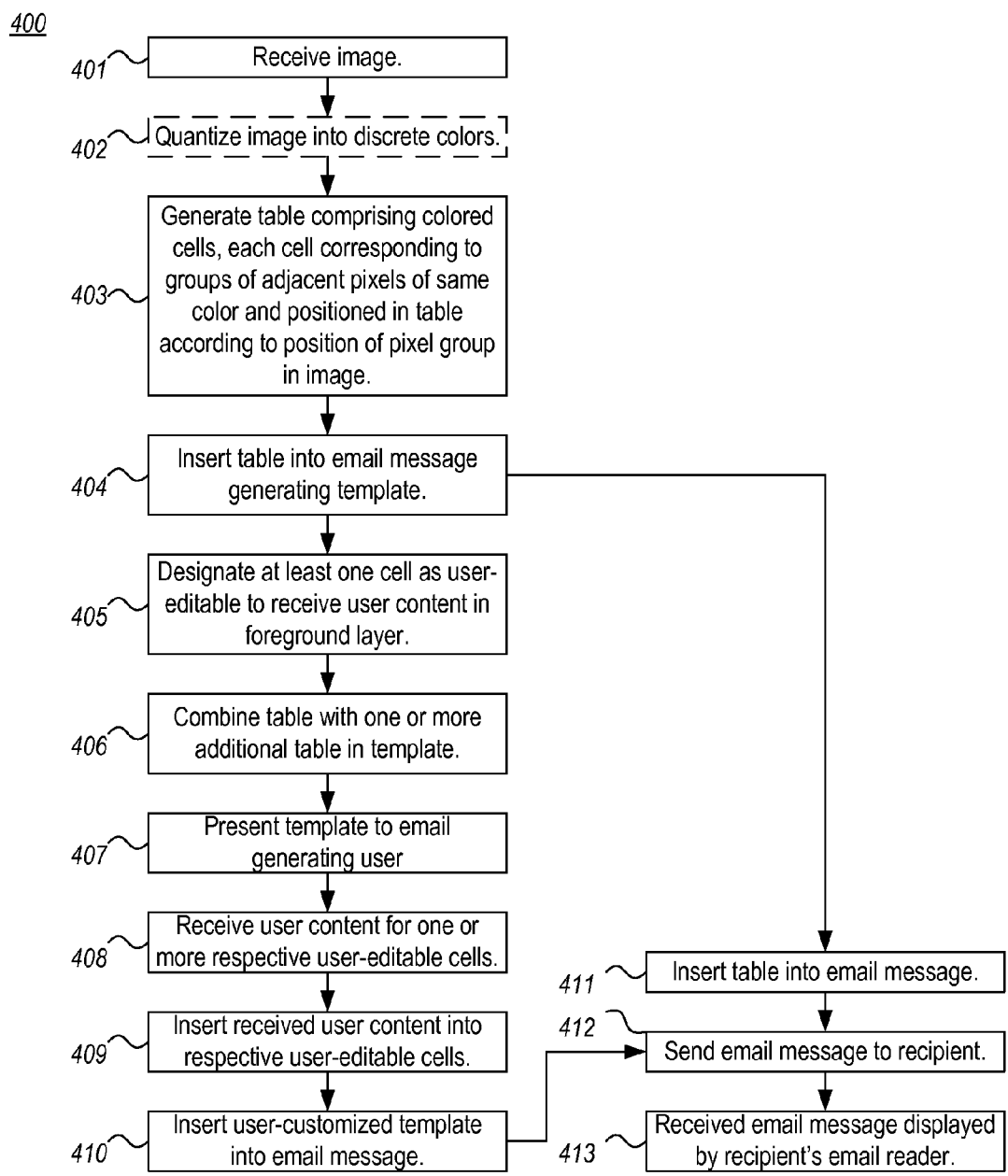
FIG. 4 is a flowchart illustrating steps performed in an exemplary embodiment of an image-to-table converter.

FIG. 4 is a flowchart illustrating steps performed in an exemplary embodiment of an image-to-table converter 330. As illustrated, in this method 400, the image-to-table converter 330 receives an image 310 (step 401), for example the background image that will be inserted in the background of user-editable content of an email message. Preferably, the pixels in the image 310 are color quantized into a plurality of discrete colors (step 402). In an embodiment, the colors are quantized into a predetermined maximum number of discrete colors. In one embodiment, the color quantization is achieved by performing a color quantization algorithm (for example, the octree color quantization algorithm, a highly memory efficient algorithm which encodes image color data as an octree up to nine levels deep, and is well known in the art) on the image.

The image-to-table converter 330 then generates an email-readable table (step 403) comprising a plurality of table cells such that each table cell corresponds to a different discrete group of pixels. In particular, each pixel in the quantized image belongs to only one discrete group of pixels. Further, each discrete group of pixels comprises at least one pixel and corresponds to either a single pixel or to a plurality of adjacent pixels having the same, or having been quantized into the same, discrete color. In an embodiment, every pixel in the quantized image belongs to one of the discrete group of pixels.

Furthermore, the pixels in each discrete group of pixels are arranged in the image having a first number of pixels in a first dimension and a second number of pixels in a second dimension. That is, referring to FIG. 5, which shows on the left an example pixilated image 510, pixels of designated colors A through L in each of groups labeled groupA, groupB, through groupL are each arranged in rectangular groups such that each row of pixels in a given group has the same number of pixels and each column in the given group have the same number of pixels.

Figure 5:
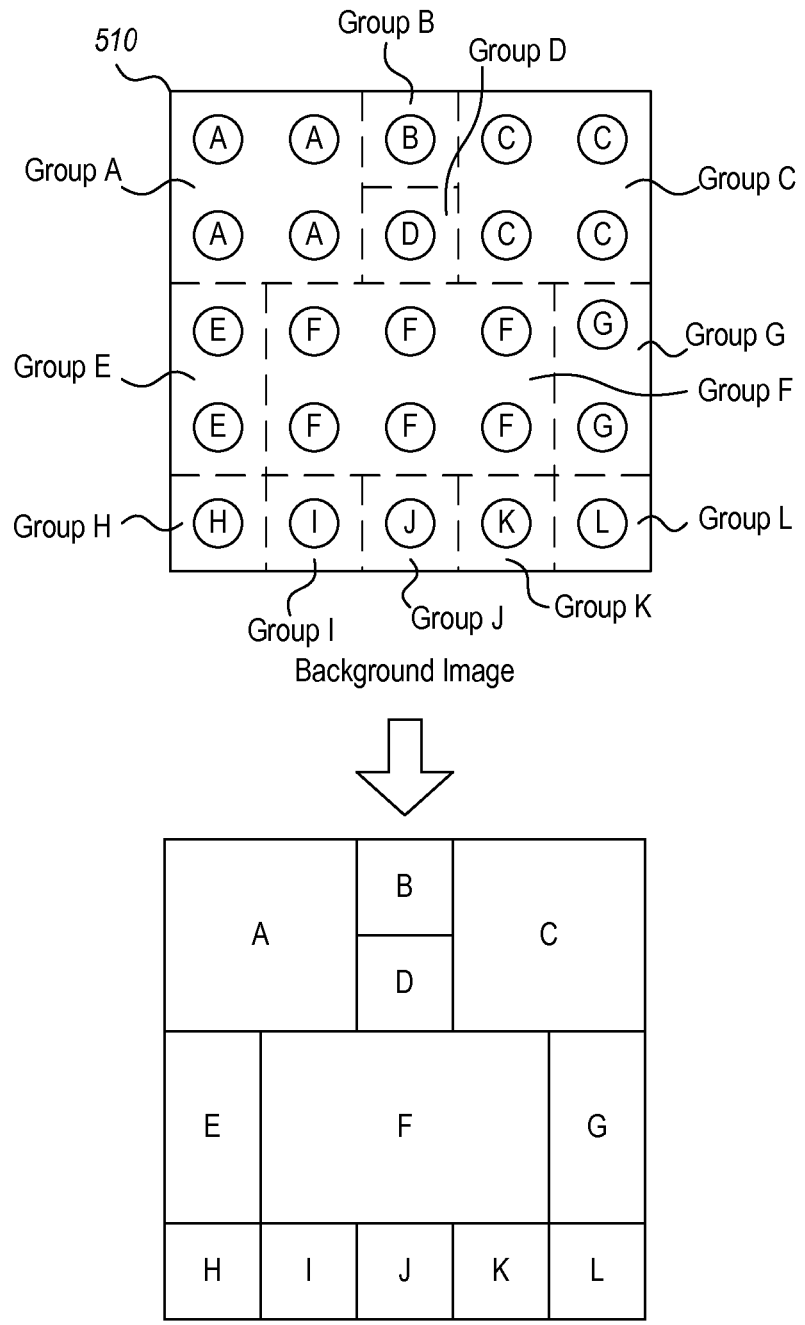
FIG. 5 is a zoomed in view of an example pixilated image and an exemplary grouping of pixels that would be achieved by an embodiment of the image-to-table converter and the colored table resulting therefrom.

The color attribute of each cell in the table is set to the discrete color A through L of the pixels belonging to the respective table cell's corresponding discrete group of pixels, as illustrated in the resulting table shown in FIG. 5.

The table may be inserted into an email message (step 411) and sent to a recipient (step 412), wherein when the email is received by the recipient, the recipient's email reader displays the email message, including colored table, to the recipient (step 413).

The table may further be inserted into an email message generating template (step 404). One or more cells in the table may be designated to receive content from a template user (i.e., made user-editable) (step 405), wherein content received from the user is inserted in a foreground layer such that the background color associated with the cell appears behind the received content. In an embodiment, the text font and text size attributes of one or more table cells are defined, and the cell height is set to the minimum text height corresponding to the text attributes. That is, a corresponding one of the first dimension and the second dimension of the table cell corresponds to a height dimension of the text font and size attributes, and the corresponding one of the first dimension and the second dimension of the at least one cell is set to at least as large as the height dimension of the text having the font and size attributes. The user-editable designated table cells automatically expand and contract to fit the received content. For example, in an HTML table, regular table cells automatically expand and contract according to the size of the inserted content.

In the template, the table may further be combined with one or more additional tables in the email message generating template (step 406). For example, one or more additional tables may be positioned adjacent to the table in either or both of the first and second dimension. For example, a one-cell header table may be positioned on top of (or inserted as a first row of) the table. Similarly, a one-cell footer table may be positioned below (or inserted as a last row of) the table. Similarly tables containing imagery to be inserted to the left of and right of the table may be positioned to the left and right of (or inserted as left-most and right-most cells in) the table. Each of the additional cells may comprise foreground imagery inserted therein. In an embodiment, none of the one or more additional tables in the email message generating template are made editable by an end user. In an alternative embodiment, one or more additional tables in the email message generating template may be made editable by an end user, but the content of the additional tables must all be in the foreground layer.

Once an email message generating template is created, it may be presented to an end user (step 407). User content may be received for one or more of the designated cells (step 408) and inserted into the respective designated cells (409). When the end user has completed customizing the template, the customized template is then inserted into an email message (step 410), sent to a recipient (step 412) and received by and displayed to the recipient (step 413).

Preferably, the table generated by the image-to-table converter 330 is an HTML table, which is compatible with most email readers.

Below is an example pseudo-code implementation for generating the email-readable table:

```
Create HTML table;
Select first set of adjacent pixels in the image, the set of
adjacent pixels adjacent along a first dimension (e.g., select first
row of image);
    While (remaining unprocessed pixels in selected row)
    {
        Current pixel.color = get(first left-most unprocessed pixel
in selected row).color;
        Create table cell in table having unit dimensions;
        Set color attribute of cell to current pixel.color;
        While (Next pixel.color = get(next unprocessed pixel
adjacent to current pixel).color = Current pixel.color)
        {
            unit increment the first dimension (e.g., width) of the
created cell
        }
    }
}
```

More particularly, this algorithm may be described as receiving an image; creating an email-readable table; selecting a set of adjacent pixels in the image, the set of adjacent pixels adjacent along a first dimension; selecting a current pixel in the selected set of adjacent pixels; determining the color of the current pixel; creating a table cell in the email readable table, the table cell associated with the current pixel and setting a background color of the created table cell to the determined color, the created table cell having initial unit dimensions; selecting a next pixel in the selected set of adjacent pixels, the selected next pixel adjacent to the current pixel; determining the color of the next pixel; if the color of the next pixel is the same as the color of the current pixel, incrementing the first dimension of the created cell and repeating the step of selecting a next pixel through the incrementing step, substituting the next pixel as the current pixel on each iteration, until the color of the next pixel is determined to be different than the color of the current pixel; and if the color of the next pixel is different than the color of the current pixel, repeating the step of creating a table cell through this repeating step, substituting the next pixel as the current pixel on each iteration, until each pixel in the set of adjacent pixels has been processed by the method, wherein each created table cell is arranged adjacent to one another in the table along the first dimension.

In an embodiment, at least one of the created table cells is configured as user-editable to receive user content, wherein all of the created table cells that are arranged adjacent to one another in the table along the first dimension expand or contract as a group in a second dimension to fully display received user content. In an embodiment, the table is an HTML table.

In another embodiment, upon receiving the image, the image is quantized into a color-reduced image comprising only colors that map to one of a pre-determined maximum number of discrete colors, and performing the remaining steps utilizing the color-reduced image in place of the image. A color quantization algorithm, such as the aforementioned an octree color quantization algorithm, may be performed on the image to map each pixel in the image to one of the discrete colors in the pre-determined maximum number of discrete colors.

Figure 8:
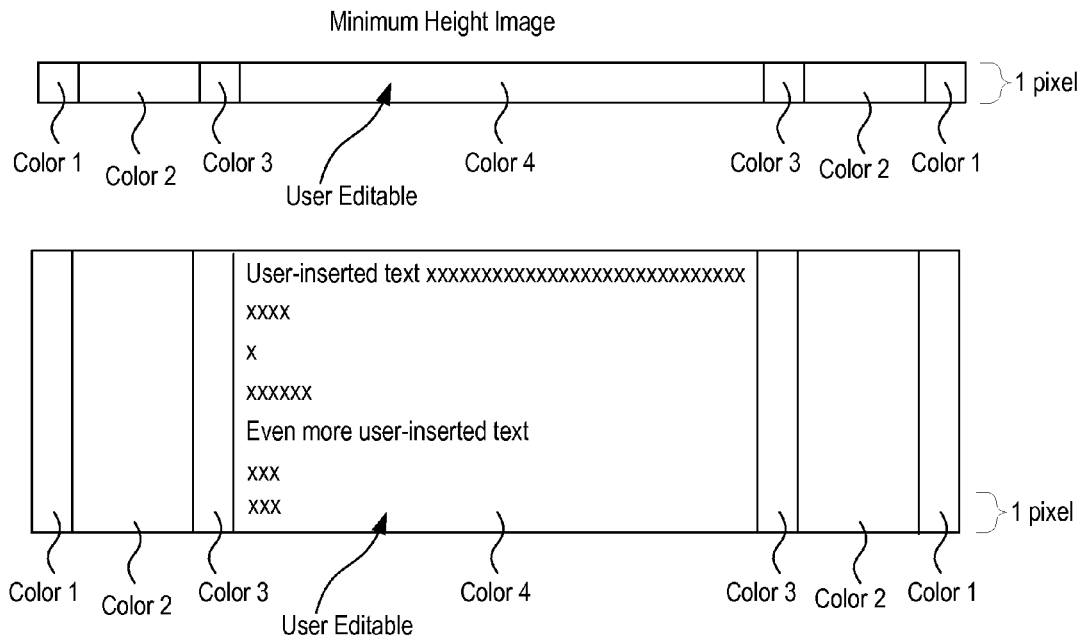
FIG. 8 illustrates an example minimum image that may be utilized to generate a variable height content image.

FIG. 8 illustrates a minimum image that may be utilized to generate a variable height content image. As illustrated, in order to create a variable height area with a background image (which may or may not include a header section and/or footer section), the minimum image required as input to the image-to-table converter is a single row of pixels. As a user enters content into one of the cells, the cell and all cells in the corresponding row expand vertically, retaining their assigned background colors. Thus, a single colored cell of a single unit dimension (or one several pixels wide) may be expanded into a vertical line (or stripe) as user-inserted content expands a user-editable cell in the table. This minimum height table is particularly useful for rendering borders in an email message where the height of the user-inserted text content varies.

In an embodiment, a flexible email message template generating tool 684 (see FIG. 6) is provided which allows an email message generating template designer to build a template for customization and use by end users, and which is compatible across multiple email readers.

Figure 9:
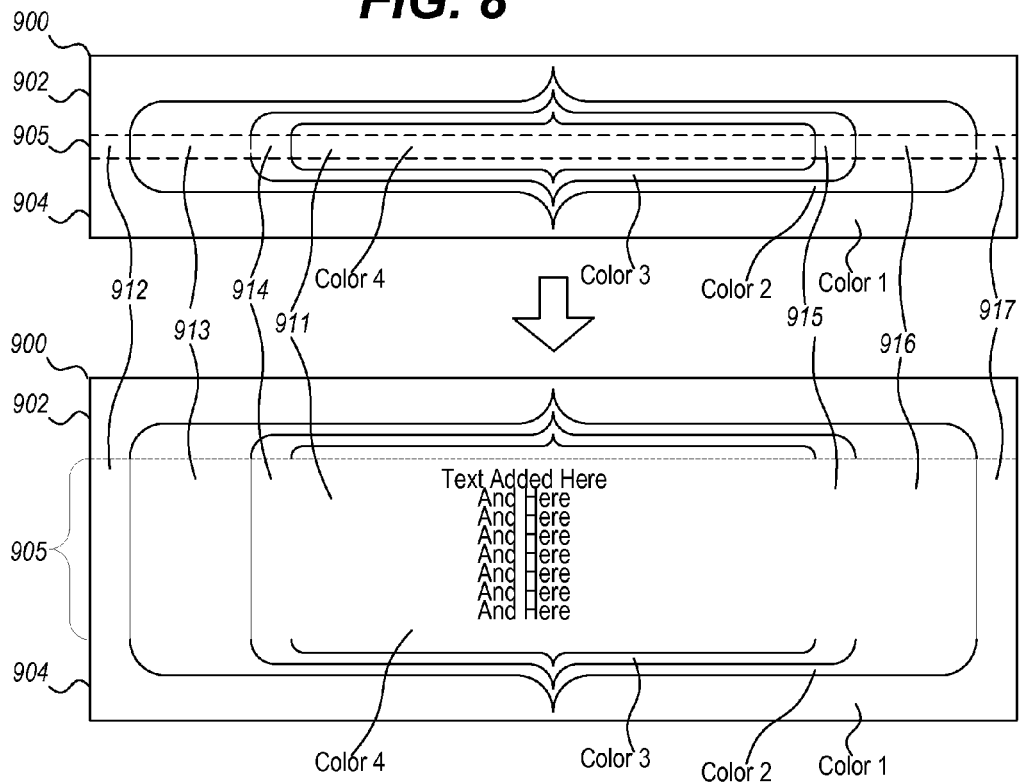
FIG. 9 illustrates an exemplary email message generating template.

In an embodiment, a flexible email message generating template (see FIG. 5) is generated which allows an end user, such as a designer of an email marketing campaign, to customize an email message for sending to one or more email recipients. For example, FIG. 9 illustrates an email message generating template 900 implemented as an HTML table having a header cell 902 which spans the width of the table and includes non-user-editable foreground imagery, a minimum middle section 905 which includes a user-editable middle cell 911 and a plurality of colored non-user-editable cells 912 913 914 915, 916, and 917 on the left and right sides of the user-editable middle cell 911, and a footer cell 904 which spans the width of the table 900 and includes non-user-editable foreground imagery. Preferably cell colors of the middle section 905 align with pixels of the same color in the header 902 and/or footer 904 so that the middle portion cells 911, 912, 913, 914, 915, 916, and 917 match the header and footer of the email message and expand to form matching lines and stripes aligned with areas of like color in the header and footer images as user content is inserted into the use-editable cell.

In operation, a user opens a template, enters content such as text into the user-editable cell(s) 911, and all the cells 912, 913, 914, 915, 916, and 917 in the same row as the user-editable cell(s) 911 expand vertically with the amount of content inserted therein.

Figure 6:
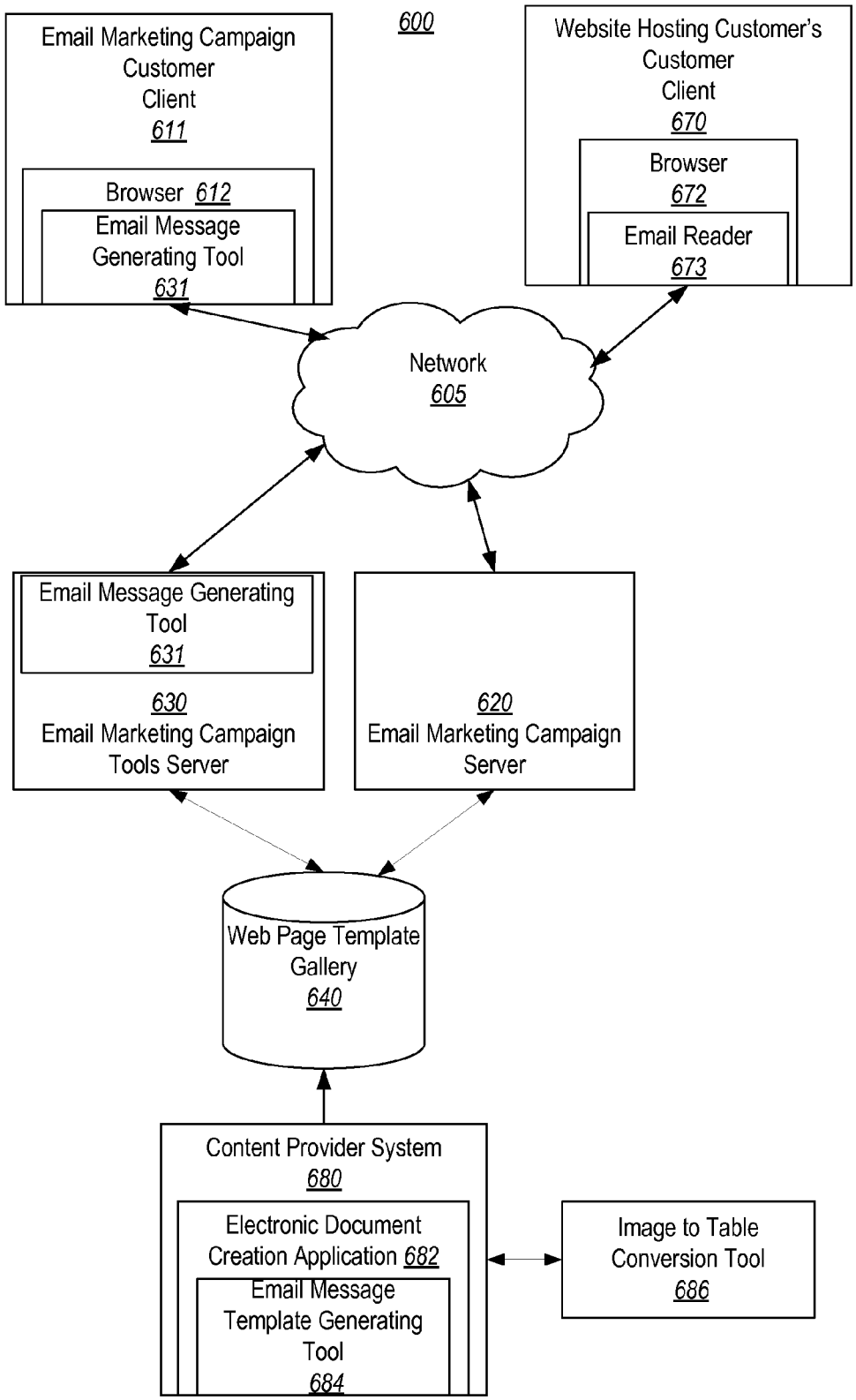
FIG. 6 is a block diagram illustrating a network environment in which an embodiment of the invention operates.

FIG. 6 illustrates an example system 600 in which embodiments of the invention are implemented. Client System 611 represents a user's computer system, for example, a customer of an email market campaign service. Client system 611 is a typically equipped modern personal computer, discussed with reference to FIG. 7, being configured to communicate over the Web and running a modern Web browser program 612. For purposes of discussion, the invention will be described in the context of a personal computer running the Microsoft Internet Explorer browser, but it will be appreciated that the invention can be applied to other browser programs that support HTML, XHTML, DHTML, XML, and other web functionality and to other intelligent devices, such as PDAs capable of running such a browser.

Client 611 communicates with an email marketing campaign service server 620 via a network 605 to set up account information and order email marketing campaign services via the client's browser 612. After setting up an account, the customer may then begin designing and editing an email to be sent out in an email marketing campaign. In an exemplary embodiment, the email marketing campaign service provides email message building tools via email marketing campaign tools server 630. In an embodiment, the client 611 may download an email message generating tool 631 to execute in their local browser 612.

The email message generating tool 631 allows the customer to download email message generating templates (stored in a template gallery 640) from the server 630. Templates are electronic email message designs that include editable areas to allow the customer to customize text, image, and design content to be sent out in an email marketing campaign. They typically include a background with or without a design, a header area, a footer area and one or more use-editable content areas. The customer may edit the user-editable content areas of the template to generate a customized email message. When the customer is satisfied with the customization of the email message, the customer can utilize additional email marketing campaign tools (not shown) to schedule the transmission of the customized email message to one or more recipients for example, client 670 running an email reader 673 (inside or outside a browser 672).

Figure 7:
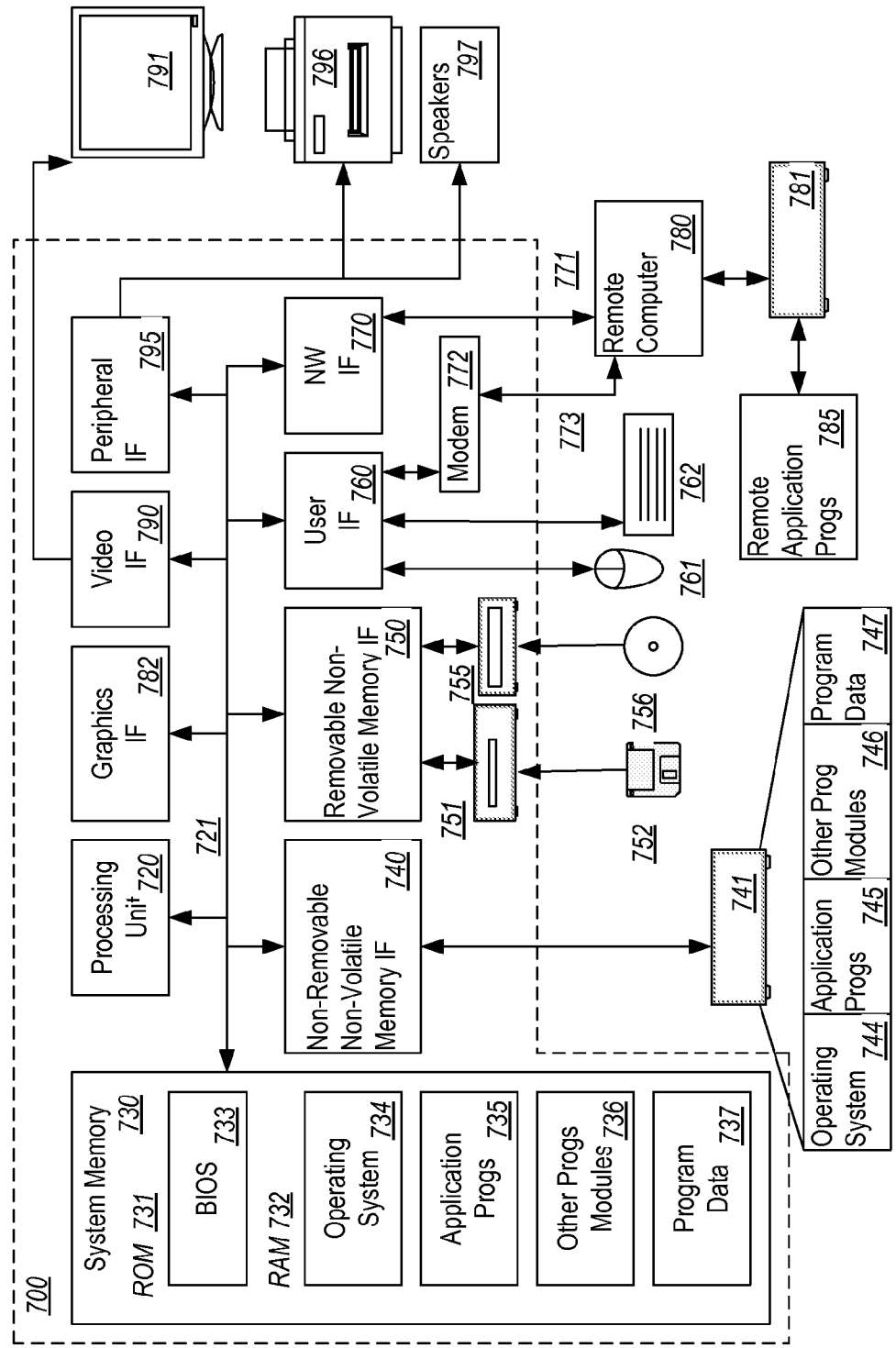
FIG. 7 is a block diagram illustrating a user computer environment in which an electronic publishing tool may operate.

Email message generating templates may be created by a content designer operating a content provider computer system 680, which may be any conventional computer system, for example, as described in reference to FIG. 7. An electronic document creation and editing application 682 executes on the content provider system 680, either locally, or remotely via a conventional networked configuration (not shown), and allows the content provider to create electronic documents, for example documents that may be printed or viewed on a display.

The electronic document creation and editing application 682 may itself provide, or may merely provide access to, an email message template generating tool 684. For example, a conventional electronic document publishing system may include an add-in or plug-in. A plugin is a computer program that interacts with a host application (for example, the electronic document creation and editing application 682) to provide a unction "on demand". Alternatively, the electronic document creation and editing application 682 may itself implement the functionality for automatically creating web page templates.

The email message template generating tool 684 receives background imagery and communicates with an image-to-table converter 686 (such as described in reference to FIGS. 3 and 4) to convert imagery to one or more colored HTML tables, and generates email message generating templates for use by customers such as customer client 611.

Turning now to FIG. 7, there is presented an example of a suitable computing system environment 700 which may implement any and all of the clients 611, 670, servers 620, 630, and content provider system 680. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention, and in particular, the email message template generating tool 684, the email message generating tool 631, and the image-to-table converter 686, may be described in the general context of computer-executable instructions, such as program modules, being executed by one or more computers or processors. Generally, program modules include routines, programs, objects, components, data structures, etc. that performs particular tasks or implement particular abstract data types. Embodiments of the invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing the invention includes a general purpose computing device in the form of one or more computers 710. Components of computer 710 may include, but are not limited to, one or more processing units 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport button and includes any information delivery media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 740 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate button. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

In summary, embodiments of the invention provide tools for developing higher compatibility with email readers, and in particular variable height background content imagery. Variable height background content imagery (i.e. borders and repeating background content) in the email are converted from images to colored table cells. Preferably, the background image is optimized for a minimum number of colors and is then transformed into a series colored table cells.

In particular, a desired background image is generated, and preferably transformed to reduce the total number of colors. The (reduced color) image is sliced pixel by pixel into constituent colors, optimizing and combining cells for identical color adjacent pixels. Individual table cells are created with the appropriate pixel width and pixel color. Optional header image and footer image cells having image content with respective bottom row and top row pixel colors that align with pixels of corresponding color in the variable height expandable may be positioned above and below the table to allow variable height emails that match the header image and footer image.

While exemplary embodiments of the invention have been discussed, the described embodiment is to be considered as illustrative rather than restrictive. The scope of the invention is as indicated in the following claims and all equivalent methods and systems.

What is claimed is:

1. A computer-implemented method for translating an image into a table, comprising:
    receiving an image comprising a plurality of pixels;
    quantizing each of the pixels in the image into a predetermined maximum number of discrete colors;
    generating, from the quantized image pixels, a table representing the image and compatible for display by an email reader, the generated table comprising a plurality of table cells, each of the table cells corresponding to a discrete group of pixels and each of the pixels in the quantized image belonging to only one of the discrete group of pixels, each of the discrete group of pixels comprising at least one pixel and corresponding to either a single pixel or to a plurality of adjacent pixels that have been quantized into a same discrete color and are arranged in the quantized image having a first number of pixels in a first dimension and a second number of pixels in a second dimension;
    setting a background color cell in the generated table to one of the predetermined maximum number of discrete colors of the pixels belonging to the respective table cell's corresponding discrete group of pixels;
    inserting the generated table into an email message, wherein the email message is displayed in the email reader; and
    designating at least one cell in the generated table to receive, in a foreground layer of the cell, content from a user, such that the image as represented by the generated table appears as a background image to the received content when the generated table is displayed in the email reader.

2. The method of claim 1, wherein the predetermined maximum number of discrete colors is limited in the quantizing step to the predetermined maximum number of discrete colors.

3. The method of claim 1, further comprising:
sending the email message to a recipient, wherein when the email reader displays the email message to the recipient, the generated table is displayed in the email reader.

4. The method of claim 1, wherein the at least one cell in the generated table designated to receive the content from the user is designated as receiving text having associated text font and size attributes, and wherein a corresponding one of a first dimension and a second dimension of the at least one cell designated as receiving text corresponds to a height dimension of the text having the associated font and size attributes, and the corresponding one of the first dimension and the second dimension of the at least one cell designated as receiving text is at least as large as the height dimension of the text having the font and size attributes.

5. The method of claim 4, wherein the designated cell expands and contracts to fit the received content.

6. The method of claim 1, wherein the generated table is an HTML table.

7. The method of claim 1, wherein the step of generating the table comprises:
creating a table compatible for display by an the email-reader;
selecting a set of adjacent pixels in the image, the set of adjacent pixels adjacent along a first dimension;
selecting a current pixel in the selected set of adjacent pixels;
determining color of the current pixel;
creating a table cell in the table, the table cell associated with the current pixel and setting a background color of the created table cell to the determined color of the current pixel, the created table cell having associated first and second dimensions;
selecting a next pixel in the selected set of adjacent pixels, the selected next pixel adjacent to the current pixel;
determining color of the next pixel;
if the color of the next pixel is the same as the color of the current pixel, incrementing the associated first dimension of the created cell and repeating the step of selecting a next pixel through the incrementing step, substituting the next pixel as the current pixel on each iteration, until the color of the next pixel is determined to be different than the color of the current pixel;
if the color of the next pixel is different than the color of the current pixel, repeating the step of creating a table cell through this repeating step, substituting the next pixel as the current pixel on each iteration, until each pixel in the set of adjacent pixels has been processed by the method, wherein each of the created table cells is arranged adjacent to one another in the table along the first dimension.

8. The method of claim 7, further comprising:
designating at least one of the created table cells as user-editable to receive user content, wherein all of the created table cells that are arranged adjacent to one another in the table along the first dimension expand or contract as a group in a second dimension to fully display received user content.

9. The method of claim 1, wherein the step of quantizing each of the pixels in the image into the predetermined maximum number of discrete colors comprises performing a color quantization algorithm on the image to map each pixel in the image to one of a plurality of discrete colors in the predetermined maximum number of discrete colors.

10. The method of claim 9, wherein the color quantization algorithm comprises an octree color quantization algorithm.

11. The method of claim 1, further comprising:
inserting the generated table into an email message generating template.

12. The method of claim 11, further comprising:
combining the generated table with one or more additional tables in the email message generating template, the one or more additional tables positioned adjacent to the generated table in either or both of the first and second dimension, and each of the one or more additional tables comprising one or more cells with foreground imagery inserted therein.

13. The method of claim 12, wherein the one or more additional tables comprises one or more of a header table comprising a header image, a footer table comprising a footer image, a left middle table comprising a left middle image, and a right middle table comprising a right middle image.

14. The method of claim 13, wherein none of the one or more additional tables in the email message generating template is editable by the user.

15. The method of claim 12, further comprising:
providing the email message generating template to the user;
in one or more designated cells, receiving content from the user and inserting the content into the respective designated cells; and
inserting the email message generating template into the email message.

16. The method of claim 15, further comprising:
sending the email message to a recipient, wherein when the email reader displays the email message to the recipient, the generated table is displayed in the email reader.

17. The method of claim 11, further comprising:
providing the email message generating template to the user;
in one or more of the designated cells, receiving content from the user and inserting the received content from the user into the respective designated cells; and
inserting the email message template into the email message.

18. The method of claim 17, further comprising:
sending the email message to a recipient, wherein when the email reader displays the email message to the recipient, the generated table is displayed in the email reader.

19. One or more non-transitory computer readable storage mediums tangibly embodying program instructions which, when executed by one or more processors, implement the method of claim 1.

* * * * *